March 6, 1951 J. L. BOGDANOFF 2,544,523
GOVERNOR
Filed March 13, 1946 2 Sheets-Sheet 1

INVENTOR.
JOHN L. BOGDANOFF.
BY
ATTORNEY

March 6, 1951  J. L. BOGDANOFF  2,544,523
GOVERNOR
Filed March 13, 1946  2 Sheets-Sheet 2
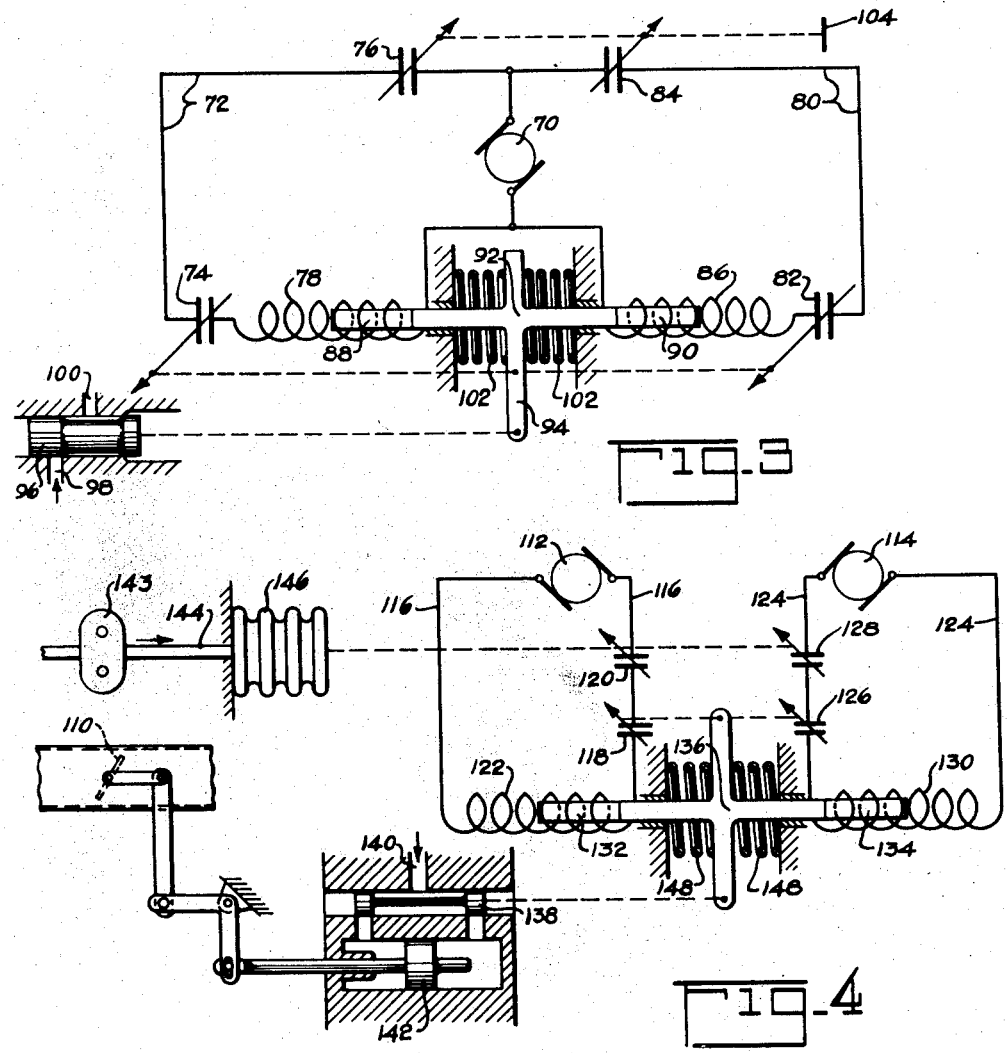
INVENTOR.
JOHN L. BOGDANOFF.
BY
ATTORNEY Patented Mar. 6, 1951

2,544,523

UNITED STATES PATENT OFFICE 2,544,523

GOVERNOR

John L. Bogdanoff, Mahwah, N. J., assignor to Wright Aeronautical Corporation, a corporation of New York Application March 13, 1946 Serial No. 654,118

7 Claims. (Cl. 175—355)

This invention relates to control systems for controlling the magnitude of a variable condition and is particularly directed to an electric control system including a pair of electric circuits having different resonant frequencies. The invention, although of general application, is of particular utility for controlling the speed of an engine.

It is an object of this invention to provide a novel control system for automatically maintaining a variable condition at a pre-set desired value such that any departure of said condition from said value results in an immediate and quick response of the control system to restore said condition to its desired value.

Specifically, the invention comprises a regulating device adjustable to vary the magnitude of a condition and a pair of electric circuits arranged to effect adjustment of said device when the currents flowing in said circuits become unequal in magnitude, said circuits each having capacitive and inductive reactances of such magnitude that they have different resonant frequencies. In one modification of the invention, the frequency of the current supplied to both circuits is automatically varied with changes in the magnitude of the condition to be controlled, while in the second modification, the resonant frequency of each circuit is automatically varied with changes in the magnitude of the condition to be controlled. In both modifications, the magnitude of the current in each circuit changes rapidly with changes in frequency at frequencies close to its resonant frequency—that is, each circuit has a sharp resonant peak. Also, in both modifications, both circuits have resonant frequencies sufficiently close together that their resonant frequency peaks overlap—that is, the frequency at which both circuits have the same current is in the region where the magnitude of the current in each circuit changes rapidly with changes in frequency. Accordingly, with either modification any change in the magnitude of the condition to be controlled results in an immediate and large difference between the magnitudes of the currents in the two circuits, which difference is immediately available for adjusting the condition regulating device to correct the magnitude condition.

Other objects of this invention will become apparent upon reading the annexed detailed description in connection with the drawing in which:

Figures 3 and 4 are diagrammatic views of modifications of Figure 1.

Figure 1:
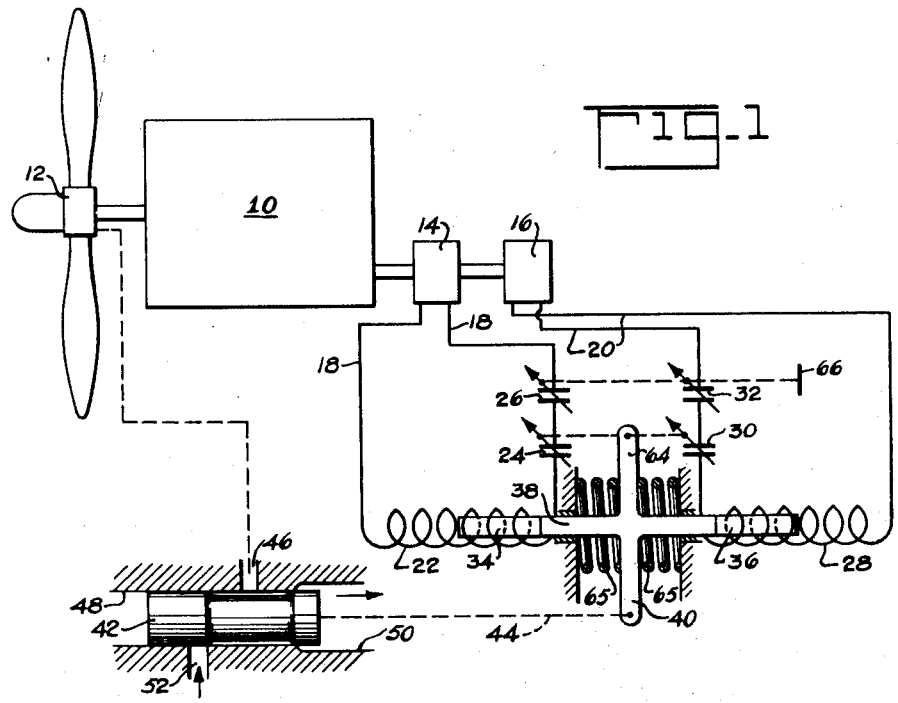
Figure 1 is a diagrammatic view of an engine having a speed control system embodying the invention.

Referring first to Figure 1, an aircraft engine 10 is drivably connected to an aircraft propeller 12 in which the pitch of the propeller blades is adjustable—for example, in a manner disclosed in Patent No. 2,204,640 to E. E. Woodward. In this way, the speed of the engine 10 can be controlled by adjusting the pitch of the propeller blades. To this end, the engine 10 is drivably connected to a pair of A. C. generators 14 and 16 which are driven at the same speed and supply electric energy at the same frequency to a pair of electric circuits 18 and 20 respectively. The circuit 18 includes an inductive winding 22 and a pair of condensers 24 and 26 and a circuit 20 includes an inductive winding 28 and a pair of condensers 30 and 32. The windings 22 and 28 are similar and are provided respectively with movable plungers or cores 34 and 36 of iron or other magnetic material. The cores 34 and 36 are connected together to an intermediate member 38 of suitable non-magnetic material. The arrangement is such that each winding 22 and 28 tends to pull in its core when there is current flowing through its associated winding. Also, when the currents flowing through the windings 22 and 28 are the same and the cores 34 and 36 are symmetrically disposed, as illustrated, the pulls on the cores 34 and 36 balance each other so that there is no movement of the member 38 connected therebetween.

The member 38 has an arm 40 operatively connected to a valve 42 by means schematically indicated at 44. The valve 42 is arranged to control the fluid pressure in a conduit 46 which is in communication with suitable propeller pitch changing mechanism—for example, such as illustrated in the aforementioned Patent No. 2,204,640. The valve 42 is slidable within a bore 48, the right end 50 of which is connected to a suitable drain. A suitable fluid under pressure, such as engine lubricating oil, is supplied to the valve 42 through a conduit 52. As illustrated in Figure 1, the valve 42 is in its neutral position—that is, the valve end of the conduit 46 is closed. Upon rightward movement of the valve 42 from its neutral position illustrated in Figure 1, fluid drains out from the conduit 46 through the right end 50 of the bore 48 to effect an increase in the propeller pitch, thereby effecting a decrease in the speed of the engine 10. Also, upon leftward movement of the valve 42 from its neutral position, fluid under pressure is supplied from the conduit 52 to the conduit 46 to effect a decrease in the propeller pitch, thereby effecting an increase in the speed of the engine.

Figure 2:
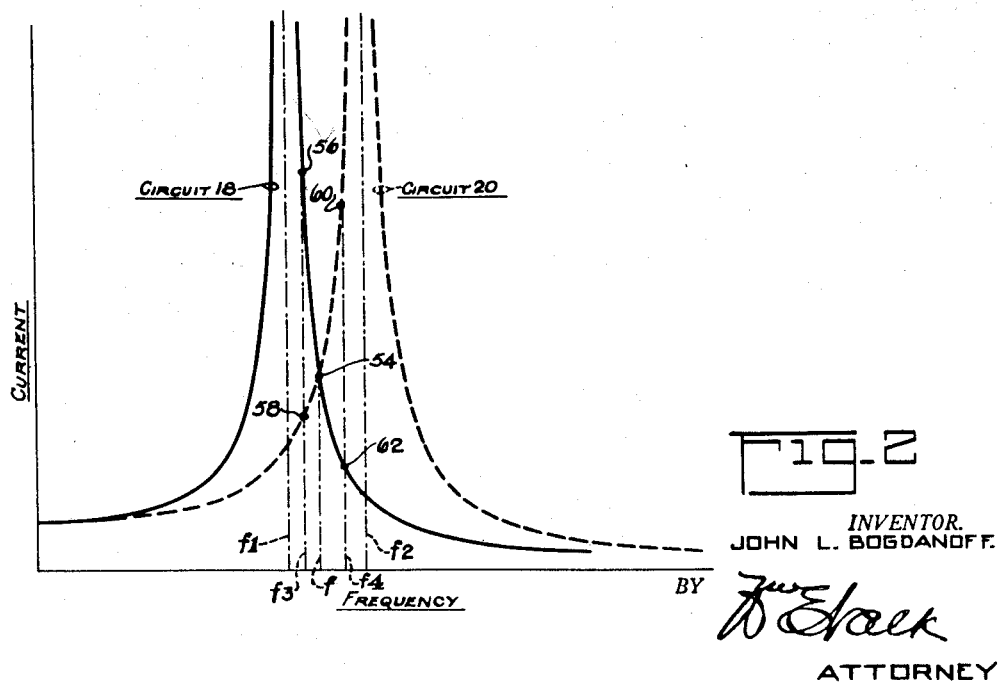
Figure 2 is a graph illustrating the variation of current with frequency in the two circuits of Figure 1.

The capacitive reactance of the condensers and the inductive reactance of the windings of the two circuits 18 and 20 are so chosen that the two circuits are resonant at different frequencies. Figure 2 graphically illustrates the relation between the magnitude of the current in each of the circuits 18 and 20 with the frequency of the electric current supplied to the circuits. As illustrated in Figure 2, the circuit 18 is resonant at a frequency $f1$—that is, the current has its peak value at this frequency—while the current in the circuit 20 is resonant at a larger frequency $f2$. Accordingly, the current-frequency curves of the two circuits cross each other at a point 54 corresponding to a frequency $f$ intermediate between the frequencies $f1$ and $f2$. Therefore, when the engine speed is such that the frequency of the current is this intermediate value $f$, the magnitude of the current flow through windings 22 and 28 is the same.

If the engine speed decreases from its value corresponding to the frequency $f$, the frequency of the electric current supplied to the circuits 18 and 20 proportionally decreases—for example, to the value $f3$—whereupon there immediately is an appreciable difference in the magnitudes of the currents flowing in the two circuits 18 and 20. Thus, the current flowing in the circuit 18 increases to the value indicated at 56 and the current flowing through the circuit 20 decreases to the value indicated at 58. As a result, there is a resultant pull on the member 38 to the left, as viewed in Figure 1, thereby moving the valve 42 to the left to admit fluid pressure to the conduit 46. Admission of fluid pressure to the conduit 46 results in a decrease in pitch of the propeller blades so that the engine speed increases toward its original value corresponding to the frequency $f$.

Similarly, if the engine speed increases from the value corresponding to the frequency $f$—for example, to the value corresponding to the frequency $f4$—the current flow through the circuit 20 increases to the value indicated at the point 60 and the current flow through the circuit 18 decreases to the value indicated at the point 62. As a result, there is a resultant pull on the member 38 to the right as viewed in Figure 1 thereby moving the valve 42 to the right to relieve the fluid pressure in the conduit 46. Upon relief of pressure in the conduit 46, the pitch of the propeller blades increases and the speed of the engine decreases toward its original value.

In order to prevent hunting of the position of the valve 42, and therefore of the engine speed, the member 38 is provided with a second arm 64 arranged to simultaneously adjust the capacity of the condensers 24 and 30. The arrangement is such that with, for example, a decrease in engine speed, the valve 42 is moved to the left, to effect an increase in the engine speed, as previously described, and at the same time the capacities of the condensers 24 and 30 are increased to decrease the resonant frequency of both circuits 18 and 20. In this way, the point 54 at which the current-frequency curves of the two circuits 18 and 20 cross each other is shifted to the left (Figure 2) to help prevent the engine speed from overshooting its original value corresponding to the frequency $f$.

The pull characteristics of the windings 22 and 28, with respect to their cores 34 and 36, preferably are such that in their range of movement, as determined by the valve 42, the pull of each winding on its core decreases as the core moves into the winding for a constant current flow through the winding. As a result, when both windings 22 and 28 have the same current flow, the position of the member 38 stabilizes at its neutral or central position. Springs 65 may also be added to help center member 38 in its neutral position.

The condensers 26 and 32 are made adjustable by a manual control handle 66 so that their capacities may be simultaneously increased or decreased. If the capacities of the condensers 26 and 32 are decreased, the resonant frequencies of circuits 18 and 20 are both increased thereby shifting the current-frequency curves of Figure 2 with their resonant frequencies to the right and moving the balance point 54 to the right. Similarly, if the capacities of the condensers 26 and 32 are increased, the resonant frequencies of the circuits 18 and 20 are both decreased thereby shifting their current-frequency curves with their resonant frequencies to the left (Figure 2) and moving the balance point 54 to the left. In this way, adjustment of the condensers 26 and 32 determines the engine speed for which the system is set—for example, an increase in the capacity of the condensers decreases the frequency and therefore decreases the speed for which the system is set and vice versa.

As illustrated in Figure 2, the current-frequency curves of the circuits 18 and 20 both have sharp resonant peaks. To this end, the capacitance and resistance of both circuits should be small. Also, as illustrated, the resonant frequencies of the two circuits, although different, are sufficiently close together that their peaks overlap so that the point 54 at which the two current-frequency curves cross is in a relatively steep portion of the curves—that is, the two curves cross at a frequency at which the magnitude of the current in each circuit changes rapidly with changes in frequency. As a result, any change in the speed of the engine, and therefore in the frequency of the current, in the two circuits from the frequency $f$ for which the system is set, immediately results in a large unbalance of the current flowing in the two circuits 18 and 20. Therefore, there immediately is a quick adjustment of the valve 42 to restore the engine speed to the value for which the system is set.

Figure 3 illustrates a modification in which only one alternating current generator is used. Generator 70 is arranged to be driven by the engine whose speed is to be controlled. The output of the generator 70 is connected to a first circuit 72 including a pair of condensers 74 and 76 and an inductive winding 78. The generator 70 is also connected to a second parallel circuit 80 comprising a pair of condensers 82 and 84 and an inductive winding 86.

The circuit arrangement of Figure 3 is similar to Figure 1 except, instead of providing a separate alternating current generator for each circuit, a single alternating current generator supplies electric energy to both circuits. The arrangement of Figure 3 is satisfactory provided the impedance of the generator 70 is small in which case the current flowing in one of the circuits 72 and 80 has substantially no effect on the current flowing in the other circuit just as in Figure 1. Accordingly, the current-frequency curves of the circuits 72 and 80 can be made substantially similar to those of the circuits 18 and 20 of Figure 1 and as illustrated in Figure 2.

The windings 78 and 86 are provided respectively with magnetic solenoid plungers or cores 88 and 90 which are connected together by an intermediate member 92, preferably of non-magnetic material. The intermediate member 92 is provided with an arm 94 operatively connected to a valve 96 arranged to control engine speed by admitting fluid pressure from the conduit 98 to the conduit 100 or by relieving the fluid pressure in the conduit 100 in a manner similar to the operation of the valve 42 of Figure 1.

In addition, as in Figure 1, the member 92 preferably is operatively connected to the condensers 74 and 82 such that upon a decrease in engine speed, the resulting movement of the member 92 not only adjusts the valve 96 to effect an increase in engine speed, but also operates to increase the capacity of the condensers 74 and 82 to decrease the resonant frequency of the circuits 72 and 80. As previously described in connection with the adjustment of condensers 24 and 30 of Figure 1, this automatic adjustment of the condensers 74 and 82 with the movement of the valve helps to prevent hunting in the system.

Springs 102 may also be provided to help center the member 92 in its neutral position. In addition, a manual control handle 104 may also be provided for simultaneously increasing or decreasing the capacity of the condensers 76 and 84 in order to determine the particular resonant frequency of each circuit and therefore the engine speed for which the system is set.

With the present invention, a pair of electric circuits are designed so that their current frequency curves have resonant peaks of different frequencies and the arrangement is such that the frequency of the electric current supplied to the two circuits varies with the condition to be controlled—namely, the engine speed—and the engine speed is adjusted in response to the occurrence of a difference between the magnitudes of the currents flowing in the two circuits. The two circuits are designed such that they have sharp resonant peaks and such that the two resonant frequencies are sufficiently close together that their current frequency curves cross each other at the facing steep sides of their peaks. In this way, any change in engine speed from the desired value results in an immediate and large difference between the magnitudes of the currents flowing in the two circuits, which difference is immediately operative to correct the engine speed.

In both the modification of Figure 1 and in the modification of Figure 3, the speed of the engine is regulated by controlling a hydraulic motor which is operative to adjust the pitch of the engine driven propeller. Obviously, the invention is not limited to this specific arrangement. For example, the valves 42 and 96 could be replaced by electric contacts controlling an electric motor for adjusting the propeller pitch. In addition, instead of regulating the engine speed by adjusting the propeller pitch, the engine speed could be regulated by adjusting its fuel supply—for example, by adjusting the usual throttle valve. Also, it should be noted that the invention is not limited to controlling the speed of an engine. Thus, it should be apparent that the control system of the present invention is of general application and can be used for controlling any variable condition as well as engine speed by providing means whereby the frequency of the electric current in a pair of circuits is varied with changes in the magnitude of the condition. For example, the speed of the alternating current generator or generators of Figures 1 and 3 could be varied with the magnitude of any condition to be controlled and movement of the members 38 and 92 of Figures 1 and 3 could be arranged to correct the magnitude of the condition. However, it should be noted that the systems of Figures 1 and 3 are particularly adapted for controlling the speed of an engine since then the alternating current generator or generators can be driven directly from the engine.

Instead of changing the frequency of the current supplied to the two circuits with changes in the magnitude of the condition to be controlled in order to bring about a difference between the magnitudes of the currents flowing in the two circuits for correcting the condition, as in Figures 1 and 3, it is also possible to change the relative magnitude of the currents flowing in the two circuits by automatically shifting the resonant frequencies of both circuits with changes in the condition to be controlled. Such an arrangement is illustrated in Figure 4 in which, for example, an engine air and/or fuel valve 110 is adjusted for controlling the engine speed.

In Figure 4, a pair of alternating current generators 112 and 114 are driven at constant equal speeds by means not shown. Generator 112 is connected to a circuit 116 including a pair of condensers 118 and 120 and an inductive winding 122. Similarly, the generator 114 is connected to a circuit 124 including a pair of condensers 126 and 128 and an inductive winding 130. As in Figure 3, a single low impedance generator may be substituted for a pair of generators 112 and 114.

The circuits 116 and 124 are designed such that their current-frequency curves have sharp resonant peaks of different frequency but their resonant frequencies are sufficiently close together that the curves cross each other at the facing steep sides of their peaks as illustrated in Figure 2. The windings 122 and 130 are provided respectively with movable magnetic cores 132 and 134 connected together to an intermediate member 136, preferably of non-magnetic material. The member 136 is operatively connected to a servo valve 138 which is arranged to control the admission of a suitable fluid pressure from a conduit 140 to one or the other side of a piston 142. As illustrated, the valve 142 is in its neutral position and no fluid pressure is admitted to either side of the piston. The piston 142 is operatively connected to the engine speed control valve 110 by suitable linkage. Also, the engine may drive a pump 143 for providing a pump output pressure proportional to engine speed. The output pressure of the pump is transmitted by a conduit 144 to a bellows 146 which in turn is operatively connected to the condensers 120 and 128 for adjusting the condensers with changes in engine speed. This connection may be such that expansion of the bellows 146 increases the capacity of both condensers 120 and 128 thereby decreasing the resonant frequency of both circuits 116 and 124 and contraction of the bellows 146 decreases the capacity of both condensers, thereby increasing the resonant frequency of both said circuits.

The arrangement of Figure 4 is such that when the member 136 and the valve 138 are in their neutral positions and when the windings 122 and 130 have the same magnitude of current flowing therethrough, the pull on the cores 132 and 134 is the same. Springs 148 may also be provided to keep the member 136 and the valve 138 in their neutral positions when the current flowing through the windings 122 and 130 is of the same magnitude. Also, in Figure 4, current-frequency curves of circuits 116 and 124 are similar to, and have the same relative positions as, the curves of circuits 18 and 20 respectively as illustrated in Figure 2. Accordingly, with the valve 138 in its neutral position, if the engine speed decreases, the bellows 146 contracts thereby decreasing the capacity of the condensers 120 and 128 and increasing the resonant frequencies of circuits 116 and 124. As a result, the current flowing through the circuit 116 increases and the current flowing through the circuit 124 decreases so that the member 136 is subjected to a resultant force to the left. The member 136 and valve 138 thereupon move to the left to admit fluid pressure to the left side of the piston 142 which moves to the right to effect an opening adjustment of the throttle valve 110 to increase the engine speed. Similarly, upon an increase in the engine speed, the bellows 146 expands to increase the capacity of the condensers 120 and 128 and decrease the resonant frequency of the circuits 116 and 124. Thereupon, the magnitude of the current flowing in the circuit 116 decreases and the magnitude of the current flowing in the circuit 124 increases thereby effecting movement of the valve 138 to the right to give the throttle valve 110 a closing adjustment to decrease the engine speed.

In order to prevent hunting, the member 136 may also be arranged to adjust the condensers 118 and 126. Thus, when the bellows 146 operates to adjust the condensers 120 and 128—for example, to increase the capacitive reactance of the circuits 116 and 124—the resulting movement of the member 136 from its neutral position is operative to decrease this capacitive reactance and vice versa. This adjustment of condensers 118 and 126 is similar to the adjustment of the condensers 24 and 30 in Figure 1 and condensers 74 and 82 in Figure 3.

Like the modifications of Figures 1 and 3, the modification of Figure 4 has also been described in connection with means for controlling the speed of an engine. Also, like the modifications of Figures 1 and 3, the modification of Figure 4 is also of general application. Thus, the bellows 146 obviously could be responsive to any condition to be controlled with the valve 110 operative to adjust the magnitude of the condition.

However, for controlling engine speed, the systems of Figures 1 and 3 are preferable since, in Figures 1 and 3, the frequency of the current in the two circuits is controlled simply and directly by the speed of the engine.

In the modification of Figures 1 and 3, the frequency of the current supplied to the two circuits is varied with respect to the resonant frequency of the two circuits in accordance with changes in the magnitude of the condition to be controlled. In Figure 4, the resonant frequency of each circuit is varied with respect to the frequency of the current supplied to each circuit in accordance with changes in the condition to be controlled. Upon an inspection of Figure 2, it is apparent that as far as the order of the magnitude of the current flowing in each circuit is concerned, it is immaterial whether the frequency of the current supplied to the two circuits is shifted relative to their resonant frequencies as in Figures 1 and 3 or whether the resonant frequencies are shifted relative to the current frequency as in Figure 4. Accordingly, as used in the claims, the expression "relative adjustment of the frequency of the current in the two circuits and the resonant frequency of the two circuits" is intended to cover the arrangement of Figures 1 and 3 as well as the arrangement of Figure 4.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination with an engine subject to starting and stopping and having means for regulating the speed of said engine over a substantial speed range; a speed control system for said engine comprising a pair of electric circuits having different resonant frequencies; alternating current generator means drivably connected to said engine for generating electric current at a frequency proportional to the speed of said engine, said generator means being electrically connected to said circuits for supplying electric current at said generated frequency to both said circuits; means controlled by said circuits for effecting operation of said speed regulating means to maintain said speed at a predetermined value; and means operable for simultaneously increasing or decreasing the resonant frequencies of said two circuits for determining the magnitude of said predetermined value of speed.

2. In combination with an engine subject to starting and stopping and having means for regulating the speed of said engine over a substantial speed range; a speed control system for said engine comprising a pair of electric circuits having different resonant frequencies; alternating current generator means drivably connected to said engine for generating electric current at a frequency proportional to the speed of said engine, said generator means being electrically connected to said circuits for supplying electric current at said generated frequency to both said circuits; and means responsive to changes from a predetermined relation between the current flowing in one of said circuits and the current flowing in the other of said circuits for effecting operation of said speed regulating means to maintain said speed at a predetermined value.

3. In combination with an engine subject to starting and stopping and having means for regulating the speed of said engine over a substantial speed range; a speed control system for said engine comprising a pair of electric circuits having different resonant frequencies; alternating current generator means drivably connected to said engine for generating electric current at a frequency proportional to the speed of said engine, said generator means being electrically connected to said circuits for supplying electric current at said generated frequency to both said circuits; and means movable in response to a difference between the magnitude of the current flowing in one of said circuits and the magnitude of the current flowing in the other of said circuits for effecting operation of said speed regulating means to maintain the speed of said engine at the magnitude for which said generated frequency has such a value intermediate said resonant frequencies that the currents in said two circuits are of equal magnitude.

4. In combination with an engine subject to starting and stopping and having means for regulating the speed of said engine over a substantial speed range; a speed control system for said engine comprising a pair of electric circuits having different resonant frequencies; alternating current generator means drivably connected to said engine for generating electric current at a frequency proportional to the speed of said engine, said generator means being electrically connected to said circuits for supplying electric current at said generated frequency to both said circuits; means movable in response to a difference between the magnitude of the current flowing in one of said circuits and the magnitude of the current flowing in the other of said circuits for effecting operation of said speed regulating means to maintain the speed of said engine at the magnitude for which said generated frequency has such a value intermediate said resonant frequencies that the currents in said two circuits are of equal magnitude; and means operable for simultaneously increasing or decreasing the resonant frequencies of said two circuits for determining the magnitude of said speed.

5. In a speed control system for a mechanism having means for regulating the speed of said mechanism; the combination of a pair of electric circuits having different resonant frequencies and at least one of said circuits having an adjustable reactance; alternating current generator means drivably connected to said mechanism for generating alternating electric current at a frequency proportional to the speed of said mechanism, said generator means being electrically connected to said circuits for supplying alternating electric current at said generated frequency to both said circuits; and means operatively connected to said regulating means and to said adjustable reactance, said last-named means being operable in response to changes from a predetermined relation between the current flowing in one of said circuits and the current flowing in the other of said circuits for effecting operation of said speed regulating device and for adjusting said reactance to help restore said relation.

6. In a speed control system for a mechanism having means for regulating the speed of said mechanism; the combination of a pair of electric circuits having different resonant frequencies and at least one of said circuits having an adjustable reactance; alternating current generator means drivably connected to said mechanism for generating alternating electric current at a frequency proportional to the speed of said mechanism, said generator means being electrically connected to said circuits for supplying alternating electric current at said generated frequency to both said circuits; and means movable in response to a difference between the magnitude of the current flowing in one of said circuits and the magnitude of the current flowing in the other of said circuits for effecting operation of said speed regulating device to maintain the speed of said mechanism at the magnitude for which said generated frequency has such a value intermediate said resonant frequencies that the currents in said two circuits are of equal magnitude, movement of said last named means also being effective to adjust said reactance to help restore equality of the electric currents in said two circuits.

7. In a speed control system for a mechanism having means for regulating the speed of said mechanism; the combination of a pair of electric circuits having different resonant frequencies and at least one of said circuits having an adjustable reactance; alternating current generator means drivably connected to said mechanism for generating alternating electric current at a frequency proportional to the speed of said mechanism, said generator means being electrically connected to said circuits for supplying alternating electric current at said generated frequency to both said circuits; means movable in response to a difference between the magnitude of the current flowing in one of said circuits and the magnitude of the current flowing in the other of said circuits for effecting operation of said speed regulating device to maintain the speed of said mechanism at the magnitude for which said generated frequency has a value intermediate said resonant frequencies that the currents in said two circuits are of equal magnitude, movement of said last named means also being effective to adjust said reactance to help restore equality of the electric currents in said two circuits; and means operable for simultaneously increasing or decreasing the resonant frequencies of said two circuits for determining the magnitude of said speed.

JOHN L. BOGDANOFF.

REFERENCES CITED

The following references are of record in the file of this patent:

UNITED STATES PATENTS

| Number | Name | Date |
|---|---|---|
| 1,490,958 | Bown | Apr. 22, 1924 |
| 1,669,524 | Kintner | May 15, 1928 |
| 2,151,127 | Logan | Mar. 21, 1939 |
| 2,260,122 | Moore | Oct. 21, 1941 |
| 2,408,451 | Sorenson | Oct. 1, 1946 |